United States Patent [19]

Hughes

[11] 4,247,119

[45] Jan. 27, 1981

[54] RECORD SIDE IDENTIFICATION APPARATUS FOR VIDEO DISC PLAYER

[75] Inventor: Larry M. Hughes, Indianapolis, Ind.

[73] Assignee: RCA Corporation, New York, N.Y.

[21] Appl. No.: 98,411

[22] Filed: Nov. 28, 1979

[51] Int. Cl.³ .............................................. G11B 17/04
[52] U.S. Cl. ..................................... 369/77; 206/309; 206/444
[58] Field of Search ............... 274/9 B, 23 A; 360/86, 360/97, 98, 99, 133; 358/128.5, 128.6; 206/444, 309, 312

[56] References Cited

U.S. PATENT DOCUMENTS

| 4,138,703 | 2/1979 | Stave et al. | 360/97 |
| 4,145,726 | 3/1979 | Conaty | 360/133 |
| 4,159,827 | 7/1979 | Torrington | 206/444 |
| 4,164,782 | 8/1979 | Stewart | 360/97 |
| 4,205,853 | 6/1980 | Torrington | 274/9 B |
| 4,206,926 | 6/1980 | Stave | 274/9 B |

Primary Examiner—Steven L. Stephan
Attorney, Agent, or Firm—E. M. Whitacre; J. S. Tripoli; D. A. Kulkarni

[57] ABSTRACT

A record side identification apparatus for a video disc player comprises a sensing member which is deflected to a first position and a second position in response to insertion of a video disc caddy into the player with a given side thereof respectively facing upward and downward. The deflected sensing member is depressed to illuminate the respective one of a pair of record side identification lights on the front instrument panel of the player during further insertion of the caddy into the player.

10 Claims, 17 Drawing Figures

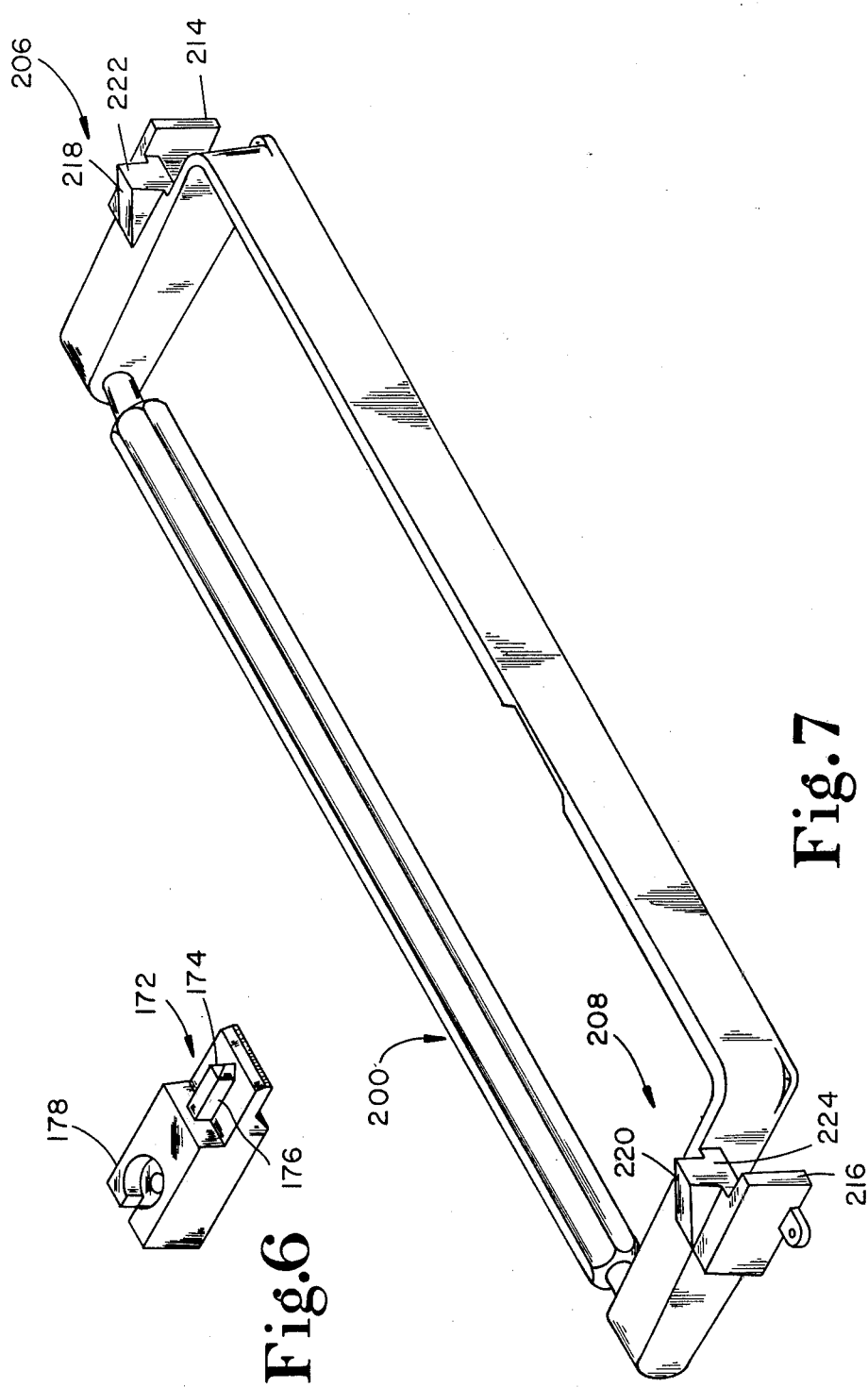

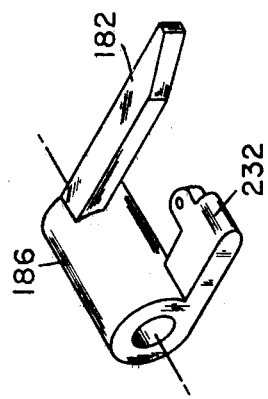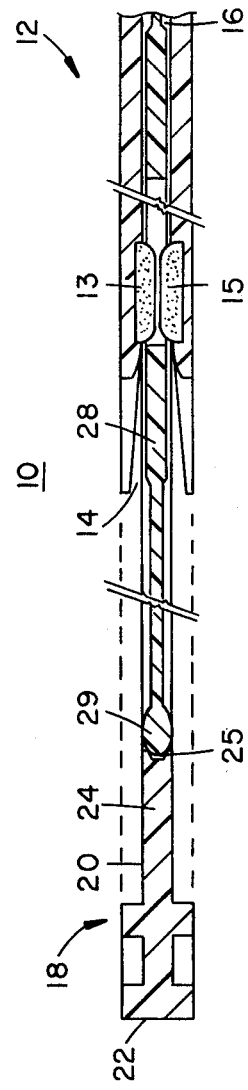

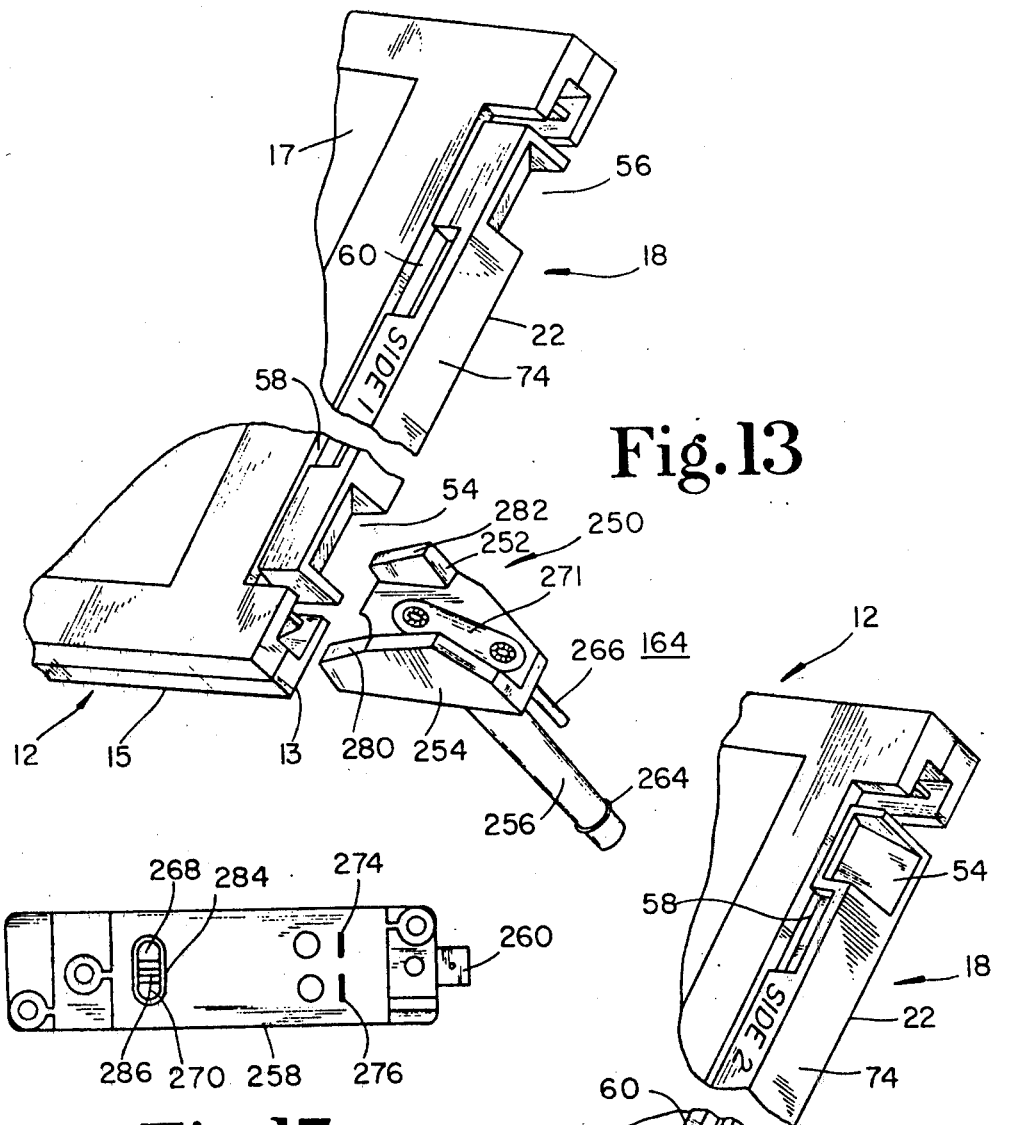
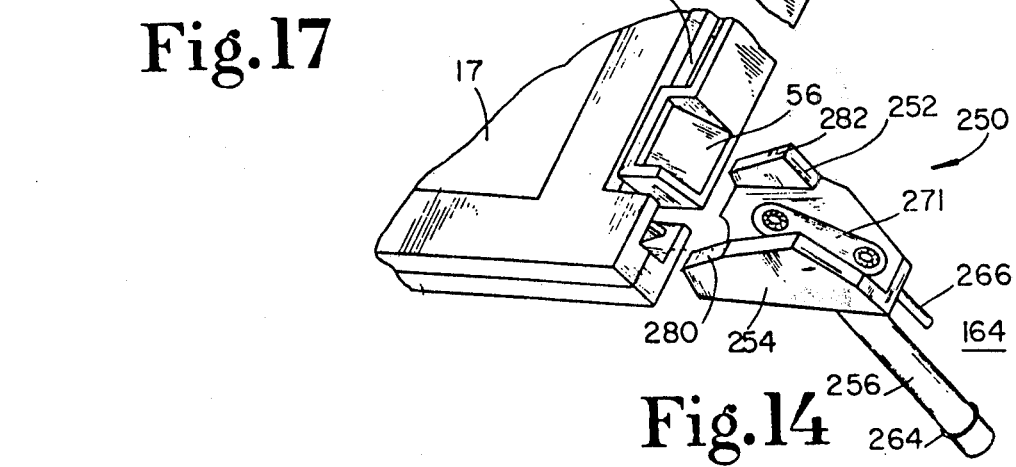

RECORD SIDE IDENTIFICATION APPARATUS FOR VIDEO DISC PLAYER

This invention generally relates to video disc players, and more particularly, to an apparatus, responsive to a disc record caddy, for indicating the record side subject to play.

In certain disc systems, video information is stored on a disc record in the form of geometric variations in a continuous spiral track disposed on the record surface. The variations in capacitance between an electrode carried by a groove-riding stylus and a conductive property of the record are sensed to reproduce the stored information. A capacitance-type video disc system is illustratively disclosed in U.S. Pat. No. 3,842,194 (Clemens).

In such systems, it is beneficial to enclose the video disc record in a thin plastic caddy which comprises an outer jacket and a record retaining spine removably located therein in order to protect the record. The spine, in turn, consists of a closure portion and a further portion having an opening for receiving the enclosed record. For record loading, a full caddy is inserted into an input slot provided in the player. A record extracting mechanism disposed in the player removes the record and the spine assembly from the jacket during subsequent jacket withdrawal, whereby the record/spine assembly is retained in the player. The player is equipped with a receiving platform for supporting the retained record/spine assembly. The retained record is subsequently transferred to a turntable for playback by raising the turntable relative to the platform. For subsequent record retrieval, the record is transferred back to the platform by lowering the turntable and an empty jacket is inserted into the player, whereby the record/spine assembly is returned back into the caddy. Withdrawal of the caddy from the player effects record retrieval. Reference is made to U.S. Pat. Nos. 4,159,827 and 4,133,540, issued to L. A. Torrington, for prior art examples of a video disc caddy and a record extracting mechanism suitable for use therewith.

In such players, it is desirable that the player be provided with a means for identifying the record side subject to playback. In a prior commonly-assigned U.S. patent application, Ser. No. 964,528, filed in the name of L. A. Torrington, a sensing member is mounted in the player in the immediate vicinity of the caddy input slot such that it is subject to deflection in a first direction when an occupied caddy is inserted into the player with a given side thereof facing upward, and is subject to deflection in a second direction, opposite to the first direction, in response to an occupied cover insertion with the given side thereof facing downward. A read-out device, responsive to the direction of deflection of the sensing member, provides an indication of the record side subject to playback. An actuating member, subject to engagement with the spine upon cover arrival at the fully inserted position in the player, holds the sensing member in the location to which it was deflected during the cover insertion, throughout the period of retention of the spine in the player.

The record side identification apparatus, pursuant to the present invention, comprises a sensing member carrying a pair of spaced sensor elements which are subject to engagement with the leading edge of the caddy in response to insertion of the caddy to a preset position in the player. One of the sensor elements is arranged to be disposed respectively in and out of the path of a recessed portion of the spine when the caddy is inserted into the player with the recessed portion disposed on the same and opposite side of the caddy insertion path as the sensing member. The engagement between the sensor elements and the leading edge of the caddy during the caddy insertion is effective to dispose the sensing member respectively in a first position and a second position in response to disposition of the one sensor element in and out of the path of said recessed portion of the spine. The sensing member is additionally subject to deflection away from the caddy in response to further insertion of the caddy into the player. A display device, responsive to the deflection of the sensing member during the further insertion of the caddy, provides an indication of the record side subject to playback.

IN THE DRAWINGS

FIG. 6 is an inverted perspective view of a spine locating member disposed in the player of FIGS. 3-5;

FIGS. 7 and 8 illustrate the details of the record extracting mechanism of the player of FIGS. 3-5;

FIG. 9 shows the return of the record/spine assembly back into the jacket when an empty jacket is inserted into the player of FIGS. 3-5 for record retrieval;

Figure 15:
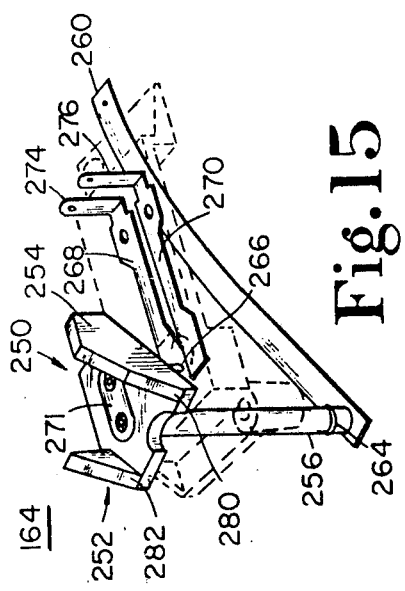
Figure 16:
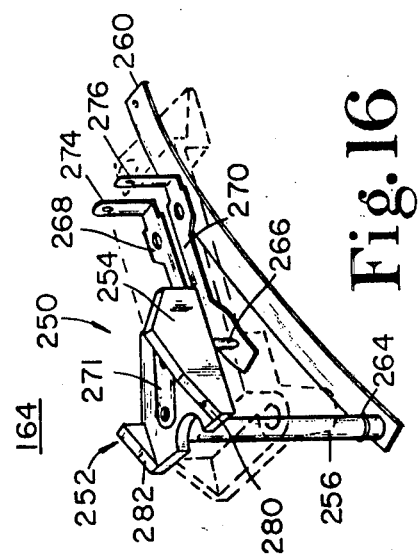
Figure 10:
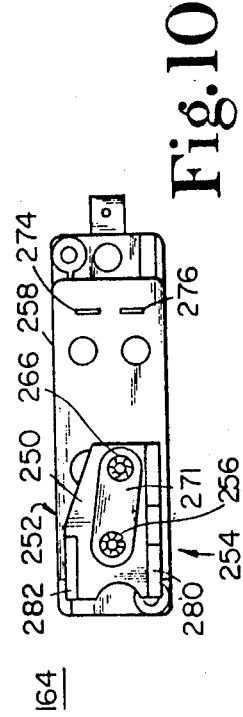
Figure 11:
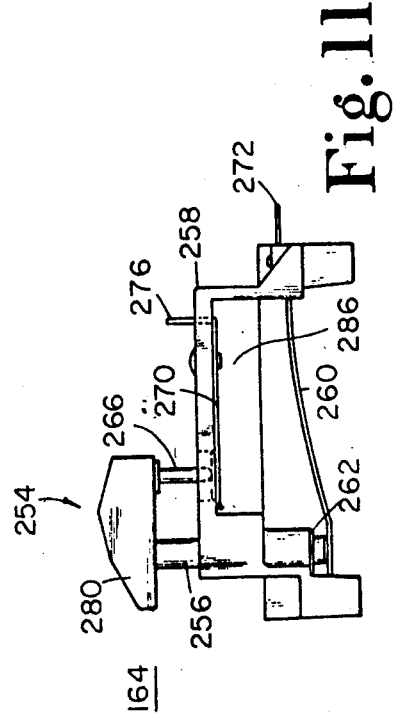
Figure 12:
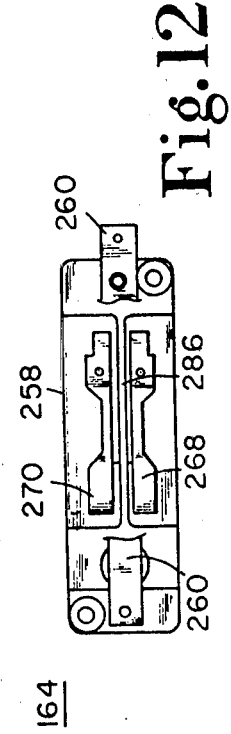

FIGS. 10, 11 and 12 respectively show the top view, the side view and the bottom view of the record side identification apparatus of this invention;

FIGS. 13 and 14 illustrate the insertion of the caddy into the player with a given side thereof respectively facing upward and downward;

FIGS. 15 and 16 show the dispositions of the sensing member of the instant record side identification mechanism when the caddy is inserted into the player with the given side thereof facing upward and downward respectively as indicated in FIGS. 13 and 14; and FIG. 17 depicts the plan view of the record side identification mechanism of FIGS. 10-16 with the sensor member removed therefrom.

Figure 1:
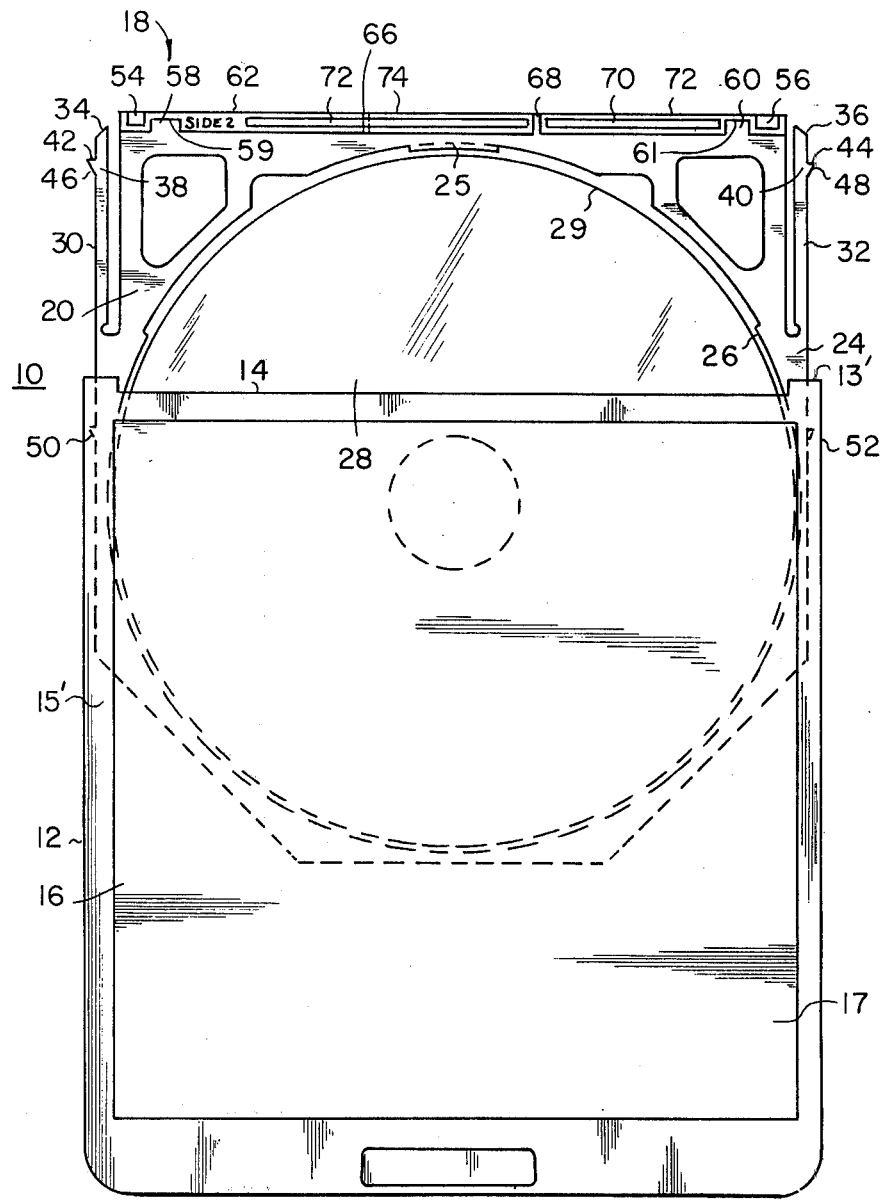
FIG. 1 shows a video disc caddy comprising an outer jacket and a record retaining spine suitable for use with the record side identification apparatus of the instant invention.

As shown in FIG. 1, the video disc caddy 10 comprises a jacket 12 having an edge opening 14 in communication with a record enclosing cavity 16 and a substantially planar, record retaining spine 18 having a major surface 20, and subject to insertion into the jacket along a path. The record retaining spine 18 has a portion 22 which serves as a closure when the spine is fully inserted into the jacket, and a portion 24 having a circular opening 26 for receiving a record 28. The spine 18 is further provided with a pair of integrally-molded, flexural latch fingers 30 and 32, which have free ends 34 and 36 adapted for lateral motion parallel to the major surface of the spine. Each of the spine latch fingers 30 and 32 has a protruding element 38 and 40. Each of the protruding elements 38 and 40 has a square edge 42 and 44, respectively, and an inclined edge 46 and 48, respectively. The protruding elements 38 and 40 are received in pockets 50 and 52 disposed in the jacket 12 for locking the spine 18 in place when it is fully inserted therein.

Figure 2:
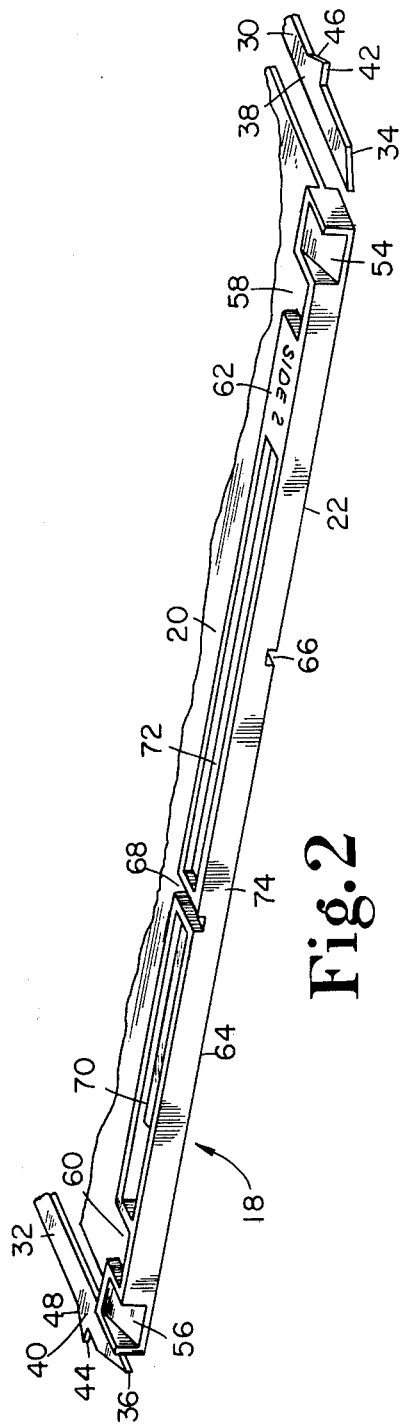
FIG. 2 illustrates a partial perspective view of the record retaining spine of FIG. 1.

As shown in FIG. 2, the record retaining spine 18 is provided with a pair of player side identification recesses 54 and 56, a pair of gripper cutouts 58 and 60, a pair of caddy side identification pads 62 and 64 and a pair of spine locating slots 66 and 68. The details of these features will be later explained in conjunction with the description of the operation of the player. Additionally, recesses 70 and 72 are disposed on both sides of the foremost edge 74 of the spine 18 for providing a constant wall thickness in order to prevent occurance of post molding sink marks.

Figure 3:
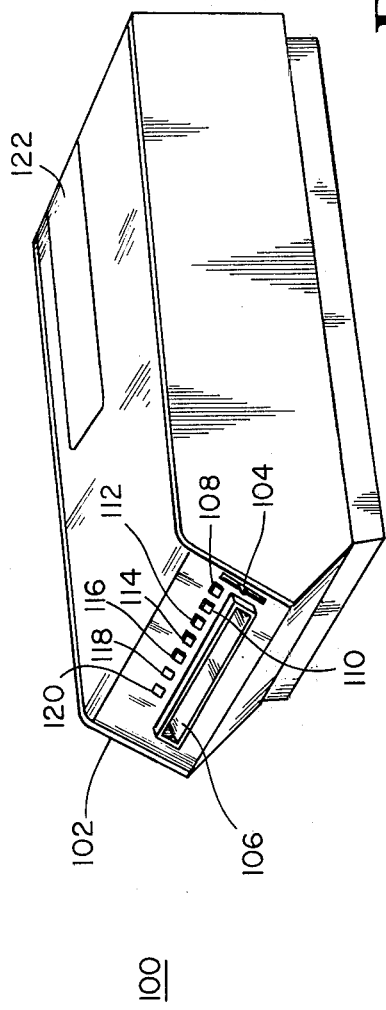
FIG. 3 represents a video disc player incorporating the record side identification apparatus in accordance with the subject invention.

Disposed on the instrument panel 102 of the video disc player 100 is a function lever 104 as shown in FIG. 3. The function lever 104 is subject to disposition in any one of the three positions thereof - "OFF", "PLAY", and "LOAD/UNLOAD". A door flap, not shown, closes the caddy input slot 106 when the function lever 104 is disposed in the OFF and PLAY positions. In the LOAD/UNLOAD position of the function lever 104, the door flap is opened to permit, for example, insertion of a caddy through the input slot to load an enclosed record into the player. A pushbutton 108 is provided to dispose the player in the "PAUSE" mode. A set of pushbuttons 110, 112, 114 and 116 is arranged on the instrument panel 102 to dispose the player in any one of the four "SEARCH" modes, i.e., fast forward/reverse and scan forward/reverse. A digital readout 118 provides indication of playing time and other functions, such as, PAUSE, LOAD and END, etc. A pair of tally lights 120 are operated to provide indication of the record side subject to play, e.g., "SIDE 1" and "SIDE 2". An access door 122 is disposed on the cover of the player to provide access to a stylus cartridge.

Figure 4:
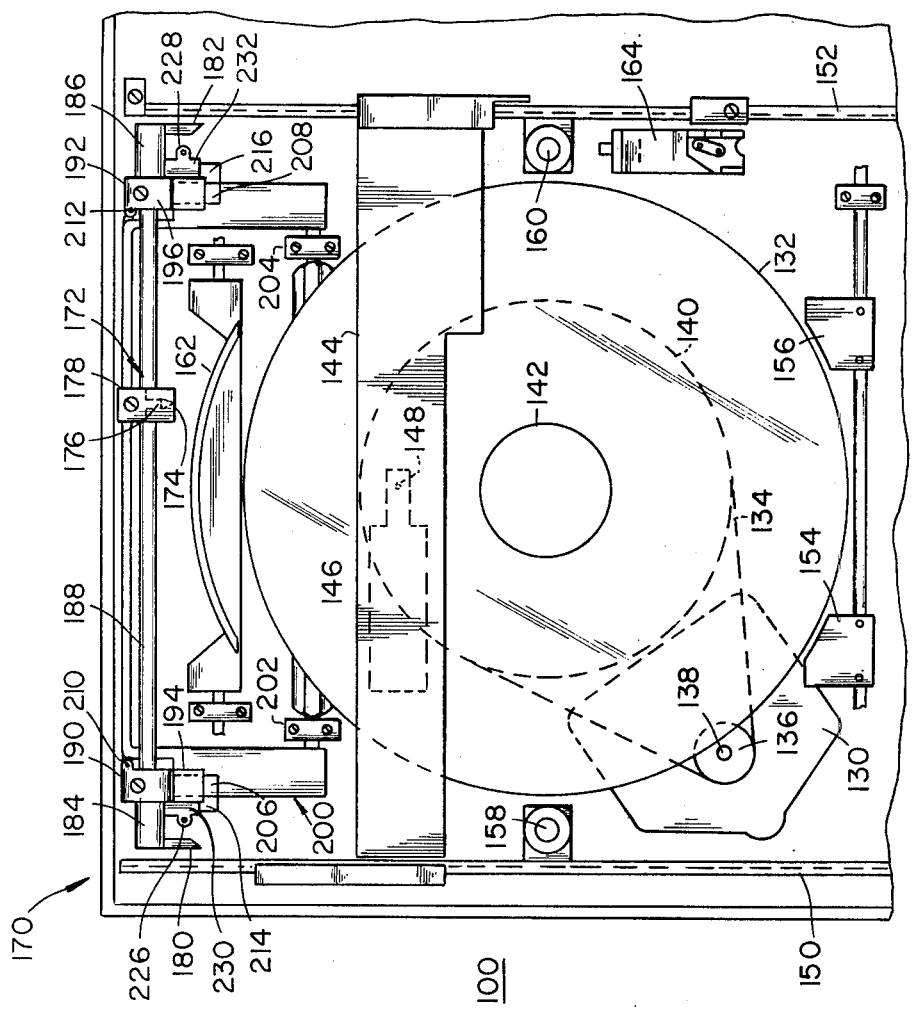
FIG. 4 is a partial plan view of the player of FIG. 3 with its cover removed.

As shown in FIG. 4, the player includes a motor 130 which drives a rotatably-mounted turntable 132 by means of a belt 134 disposed about a pulley 136 mounted on the motor shaft 138 and a flange 140 arranged on the underside of the turntable. A spindle 142 is disposed on the turntable 132 to center a record deposited thereon. A carriage 144, having a compartment for receiving the stylus cartridge 146, is subject to translation during playback from the back of the player toward the turntable spindle 142 in synchronism with the motion of a pickup stylus 148 riding in a spiral information groove disposed on the record.

The player is further equipped with a pair of rails 150 and 152, aligned with input slot 106, for guiding the caddy insertion into the player along a further path. A set of spring-loaded receiver pads 154, 156, 158, 160 and 162 are disposed in the player for supporting the spine and the record therein upon withdrawal of the jacket from the player such that the record/spine assembly is precisely aligned with the centerline of the guide rails 150 and 152.

Pursuant to this invention, the player further includes a record side identifying mechanism 164 which operates the SIDE 1/SIDE 2 tally lights 120 on the player instrument panel 102 to provide an indication of the record side subject to play. The record side identification mechanism 164 will be described in detail in conjunction with the description of FIGS. 10-17.

The player is further equipped with a record extracting mechanism 170 which will be described in detail first. To load a record into the player, the function lever 104 is disposed in the LOAD/UNLOAD position and a stored-in caddy is inserted into the player along the guide rails 150 and 152. The caddy deflects the front receiver pads 154 and 156, the intermediate receiver pads 158 and 160, and the back receiver pad 162 as it is inserted into the player. The record side identifier 164, in response to the absence or presence of the recesses 54 and 56 on the top side of the spine 18, activates the appropriate one of the tally lights 120, e.g., SIDE 1 or SIDE 2, respectively, during the caddy insertion as will become clear from the description of the instant record side identification mechanism 164. The caddy engages the carriage 144 as it is pushed into the player, thereby returning the carriage to the starting position at the back end of the player.

A locating member 172, having a tapered lead-in portion 174 and a base portion 176, is disposed in the player for reception in the appropriate one of the slots 66 and 68 provided in the closure portion 22 of the spine 18 during arrival of the caddy at the fully inserted position in the player in order to accurately locate the spine in the lateral direction in the player. The spine locating member 172 is disposed on a retainer bracket 178 mounted in the player as shown in FIG. 6.

Figure 5:
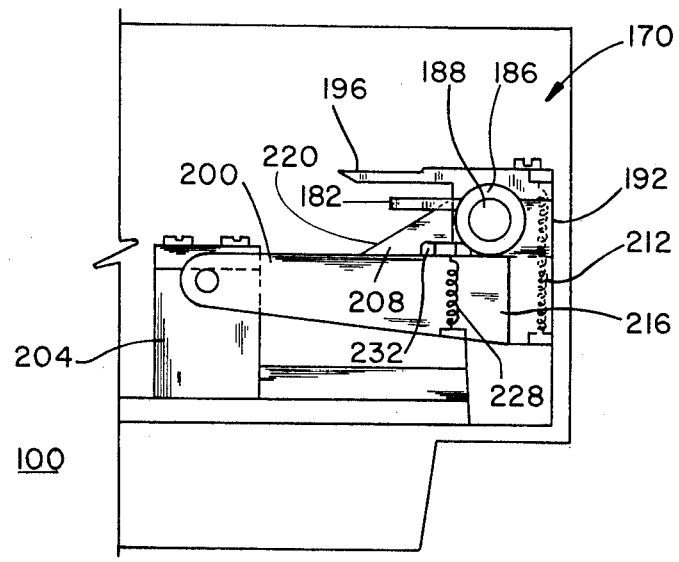
FIG. 5 depicts a partial side view of the player of FIGS. 3 and 4.

As the caddy reaches the fully inserted position in the player, the wedge-like portions of a pair of latch defeat members 180 and 182 enter the jacket to deflect the latch fingers 30 and 32 of the spine 18 to free the spine 18 and the enclosed record 28 from the jacket 12. The latch defeat members 180 and 182 are disposed on a pair of collars 184 and 186 which are fixedly mounted on a shaft 188. The shaft 188 is rotatably mounted in the player by means of a pair of pedestals 190 and 192. A pair of hold-down members 194 and 196 are disposed on the pedestals 190 and 192 to precisely locate the spine 18 in the vertical direction. The relative position of the holddown member 196 is shown more clearly in FIG. 5.

A gripper arm 200 is pivotally mounted in the player by means of a pair of upstanding supports 202 and 204. Disposed on the gripper arm 200 are a pair of jaw-like gripper members 206 and 208 as shown in FIG. 7. The gripper arm 200 is biased toward the hold-down members 194 and 196 by a pair of coil springs 210 and 212 in the manner indicated in FIG. 5. A pair of ledge portions 214 and 216 disposed on the gripper arm 200 engage the underside of the collars 184 and 186 in order to accurately position the gripper members 206 and 208 and the latch defeat members 180 and 182 in the vertical direction.

As the caddy arrives at the fully inserted position in the player, the foremost edge of the caddy rides up the ramp portions 218 and 220 of the gripper members 206 and 208 to deflect the gripper arm downward until the coil springs 210 and 212 cause the gripper members to snap into the cutouts 50 and 60 disposed in the closure portion 22 of the spine 18 to lock the spine to the player. A pair of leaf springs (not shown) disposed in the player bias the spine such that the engagement between the locating surfaces 222 and 224 of the gripper members 206 and 208 and the locating surfaces 59 and 61 of the cutouts 58 and 60 is ensured. Since the spine 18 is released from the jacket 12 through the operation of the latch defeat members 180 and 182 and latched to the player through the operation of the spine gripper members 206 and 208, subsequent withdrawal of the jacket leaves the spine and the record assembly in the player. The spring loaded lift pads and hold-down members disposed in the player serve to accurately hold the retained spine/record assembly at the correct elevation in the player. The lateral registration of the spine/record assembly in the player is assured by the reception of the locating member 172 in the appropriate one of the cutouts 66 and 68 disposed in the spine 18. The engagement between the locating walls of the gripper members 206 and 208 and the cutouts 58 and 60 disposed in the spine 18 assure the front-to-back alignment of the spine/record assembly in the player.

As soon as the latch defeat members 180 and 182 are freed from the jacket during caddy withdrawal, a pair of coil springs 226 and 228 disposed between the gripper arm 200 and the levers 230 and 232 arranged on the collars 14 and 186 cause downward deflection of the latch defeat members. The construction details of the collar 186 are shown in FIG. 8. The construction of the other collar 184 is similar.

To transfer the retained record to the turntable 132 for playback, the function lever 104 is moved to the PLAY position, which, in turn, raises the turntable and starts the turntable motor 130. The turntable 132 picks up the record as it is raised, leaving the spine 18 resting on the receiver pads 154, 156, 158, 160 and 162. The pickup stylus 148 is gently lowered into the spiral information groove on the record and the carriage 144 is translated toward the record center in correlation with the inward motion of the stylus. The recovered signal is processed to reconstruct a composite television signal containing picture and sound information.

To transfer the record back to the receiver pads 154-162, the function lever 104 is moved back to the LOAD/UNLOAD position, which lowers the turntable 132 to a height below the lift pads. To ensure that the record is properly returned into the record opening 26 disposed in the spine 18 as the turntable 132 is lowered, it is important to accurately locate the spine in the player - in the front-to-back, lateral and vertical directions. As previously indicated, the gripper members 206 and 208 assure the front-to-back alignment, the locating member 172 ensures lateral registration and the receiver pads 154-162 provide accurate vertical alignment. To provide an indication of the degree of precision involved, consider the following illustrative dimensions - record outside diameter=11.908±0.016 inches, spine opening diameter=11.985±0.015 inches. The caddy and the player mechanisms described herein are capable of functioning with such small clearances.

As shown in FIG. 9, the jacket 12 is provided with a pair of lip pads 13 and 15 to prevent dust and debris from entering into the record enclosing cavity 16 of the jacket and to wipe the dust and debris from the record 28 as it is inserted into the jacket and removed therefrom. Typically, the clearance between the lip pads is 0.020 inches and the record thickness is 0.076 inches. When the empty jacket 12 is inserted into the player to retrieve the record/spine assembly, it thrusts the record 28 forward in the direction of insertion because of interference between the lip pads 13 and 15 and the record. Such forward thrust has tendency to cause the record 28 to slide over or under the spine 18, which, in turn, may cause the record to jam between the spine and the jacket 12. This condition especially occurs when the plane of the record 28 is not precisely aligned with the plane of the jacket 12 and the spine 18. To prevent such jams, the peripheral wall of the spine 18 defining the record opening 26 is provided with a pocket 25 in which the record bead 29 is trapped when the record is thrust forward during the jacket insertion. Such configuration of the spine is the subject matter of a concurrently-filed, commonly-assigned, copending application of L. A. Torrington and entitled "VIDEO DISC CADDY HAVING DISC ENTRAPMENT".

To retrieve the record from the player, an empty jacket 12 is inserted into the player through the input slot 106 along the guide rails 150 and 152.

As the jacket 12 arrives at the fully inserted position in the player, the front edge thereof engages the deflected latch defeat members 180 and 182 to cause further downward deflection thereof. During such further downward deflection, the levers 230 and 232 disposed on the collars 184 and 186 bear upon the ledge positions 214 and 216 disposed on the gripper arm 200 to effect downward displacement thereof, whereby the spine 18 is released from the gripper arm. When the jacket 12 is fully inserted into the player, the spine latch fingers 30 and 32 snap back into the pockets 50 and 52 to lock the spine 18 to the jacket and the record/spine assembly is thus retrieved when the caddy is withdrawn.

Certain features of the caddy, such as, spine lateral locking mechanism, lateral locating slots, etc., are the subject matter of a concurrently-filed, commonly-assigned, copending U.S. patent application of L. A. Torrington, et al, entitled "VIDEO DISC CADDY".

The construction and operation of the record side identification apparatus 164 of the subject invention will now be described in detail in conjunction with FIGS. 10-16. A sensing member 250, carrying a pair of spaced elements 252 and 254, is mounting on a conductive pivot pin 256. The pivot pin 256 is rotatably and translatably mounted in a housing 258. The housing 258 is mounted in the player such that the sensing member 250 is subject to disposition in the path of the leading edge of the caddy 10 during its arrival at a predetermined position in the player. A conductive leaf spring 260, riveted at its one end to the housing 258, biases the pivot pin 256 such that the sensing member 250 is raised to engage the caddy when it is inserted into the player. A horseshoe-shaped clip 262 is mounted in a peripheral groove 264 disposed in the pivot pin 256 to limit the upward stroke of the sensing member 250.

Mounted on the sensing member 250 is actuating pin 266 which is subject to engagement with the respective one of a pair of contact blades 268 and 270 disposed on the housing 258, when the sensing member is depressed during further insertion of the caddy 10 into the player. The actuating pin 266 is connected to the pivot pin 256 by a conductive shim 271. The leaf spring 260 has one end that defines a common terminal 272. The terminal segments of the contact blades 268 and 270 respectively serve to define the SIDE 1 terminal 274 and the SIDE 2 terminal 276. The terminals 274 and 276 are respectively connected to the SIDE 1 and SIDE 2 circuits which illuminate the SIDE 1 and SIDE 2 tally lights 120 disposed on the front instrument panel 102 of the player.

The operation of the record side identification apparatus 164 will now be explained. As previously indicated, the front edge of the spine 18 is provided with a pair of recesses 54 and 56. It will be noted that only one recess 54 is needed for the operation of the record side identification mechanism 164. The other recess 56 does not serve any particular function. When the caddy 10 is inserted into the player with the recesses 54 and 56 facing downward as indicated in FIG. 13, i.e., with the recess 54 in the path of the sensor element 252, the ramp portion 280 of the sensor element 254 engages the edge portion 13 of the caddy, and the ramp portion 282 of the sensor element 252 is in registration with the recess 54 to effect rotation of the sensing member 250 to the position shown in FIG. 15. In this position of the sensing member 250, the actuating pin 266 is aligned with the SIDE 1 contact blade 268. As the caddy is further inserted into the player, the exterior side edge 15 of the caddy depresses the sensing member 254 to establish contact between the actuating pin 266 and the SIDE 1 contact blade 268 to illuminate the SIDE 1 tally light on the front instrument panel of the player. The height of the sensor element 254 is greater than the height of the other sensor element 252 to ensure that the smaller sensor element 252 does not rub against the label portion 17 of the jacket 12. The bigger sensor element 254 engages the jacket 12 in the non-label region 15 as indicated previously.

When the caddy 10 is inserted into the player with the recesses 54 and 56 facing upward as illustrated in FIG. 14, i.e., with the recess 54 out of the path of the shorter sensor element 252, both ramp portions 280 and 282 of the sensor elements engage the leading edge of the caddy to cause disposition of the sensing member 250 in the location shown in FIG. 16. In this position of the sensing member 250, the actuating pin 266 is aligned with the SIDE 2 contact blade 270, so that the SIDE 2 circuit is closed to illuminate the SIDE 2 tally light on the front instrument panel of the player during further insertion of the caddy into the player.

As shown in FIG. 17, an oval-shaped opening 284 is disposed in the housing 258 in which the terminal portion of the actuating pin 266 is received for limiting the excursion of the sensor member 250. The oval-shaped opening 284 is divided into two compartments by a partition 286 disposed in the housing 258. As soon as the sensing member 250 is depressed slightly, the partition 286 locks the sensing member into the position to which it was deflected during its initial encounter with the caddy.

Upon jacket withdrawal, the spine 18 holds the sensing member 250 in the depressed position to provide continuous record side indication on the front instrument panel 102 of the player throughout the period of retention of the spine in the player.

What is claimed is:

1. In a player for use with a disc record removably located within a protective caddy comprising a jacket and a record retaining spine subject to insertion into said jacket; said record being enclosed in said caddy such that the respective sides of said record are associated with the corresponding sides of said spine; said spine and said jacket defining a leading edge; the leading edge of said spine having a recessed portion; said player having an input slot through which an occupied caddy is inserted along a path to load an enclosed record therein; said player additionally including a record extracting mechanism for removing said retaining spine from said jacket during jacket withdrawal subsequent to an occupied caddy arrival at a fully inserted position in said player, thereby retaining said spine and said enclosed record in said player; apparatus comprising;

(A) a sensing member carrying a pair of spaced sensor elements subject to engagement with said leading edge of said caddy in response to insertion of said caddy to a predetermined position in said player; one of said sensor elements being arranged to be disposed respectively in and out of the path of said recessed portion of said spine when said caddy is inserted into said player with said recessed portion disposed on the same and opposite side of said caddy insertion path as said sensing member; said engagement between said sensor elements and said leading edge of said caddy during said caddy insertion being effective to dispose said sensing member respectively in a first position and a second position in response to disposition of said one sensor element in and out of the path of said recessed portion of said spine; said sensing member being additionally subject to deflection away from said caddy in response to further insertion of said caddy into said player; and (B) means responsive to said deflection of said sensing member during said further insertion of said caddy for providing an indication of the respective position of said sensing member.

2. The apparatus as defined in claim 1 wherein said sensing member is secured to a pivot pin disposed substantially orthogonally to said leading edge of said caddy during insertion thereof into said player for motion between said first position and said second position in response to said engagement between said sensor elements and said leading edge of said caddy during said caddy insertion; wherein said pivot pin is translatably mounted in said player to allow said deflection of said sensing member away from said caddy in response to said further insertion of said caddy into said player.

3. The apparatus as defined in claim 2 wherein a contact is disposed on said sensing member for engagement with the respective one of a pair of terminals in response to said deflection of said sensing member during said further insertion of said caddy into said player; wherein said apparatus further includes means for coupling said contact to a common terminal.

4. The apparatus as defined in claim 3 wherein said pivot pin is conductive; wherein said conductive pivot pin also serves as said coupling means.

5. The apparatus as defined in claim 4 further including a leaf spring for biasing said sensing member such that said sensor elements are disposed in the path of said caddy during insertion thereof into said player.

6. The apparatus as defined in claim 5 wherein said leaf spring is conductive; wherein said conductive leaf spring also serves as said common terminal.

7. The apparatus as defined in claim 6 further including a partition disposed between said terminals.

8. The apparatus as defined in claim 2 wherein each of said sensor elements comprises a wall disposed substantially perpendicularly to said leading edge of said caddy during insertion thereof into said player; each of said sensor walls defining an inclined surface arranged for disposition in the path of said leading edge of said caddy when said caddy is inserted into said player.

9. The apparatus as defined in claim 8 wherein the maximum dimension of one of said sensor walls in a direction at right angles to said caddy insertion path is greater than the maximum dimension of the other end of said sensor walls in said direction.

10. The apparatus as defined in claim 9 wherein the location of said one wall is such that it engages said jacket in a non-label region.

* * * * *